United States Patent
Aoyagi (10) Patent No.: US 11,403,399 B2
(45) Date of Patent: Aug. 2, 2022

(54) INFORMATION PROCESSING APPARATUS CAPABLE OF DETECTING SOFTWARE TAMPERING AND CONTROL METHOD THEREFOR

(71) Applicant: CANON KABUSHIKI KAISHA, Tokyo (JP)

(72) Inventor: Takeshi Aoyagi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 49 days.

(21) Appl. No.: 16/677,527

(22) Filed: Nov. 7, 2019

(65) Prior Publication Data
US 2020/0151334 A1 May 14, 2020

(30) Foreign Application Priority Data
Nov. 14, 2018 (JP) .............................. JP2018-213732

(51) Int. Cl.
| | |
|---|---|
| *G06F 21/56* | (2013.01) |
| *G06F 21/57* | (2013.01) |
| *G06F 21/51* | (2013.01) |
| *G06F 21/81* | (2013.01) |
| *G06F 1/08* | (2006.01) |

(Continued)

(52) U.S. Cl.
CPC .............. *G06F 21/566* (2013.01); *G06F 1/08* (2013.01); *G06F 1/12* (2013.01); *G06F 3/1222* (2013.01); *G06F 3/1238* (2013.01); *G06F 21/51* (2013.01); *G06F 21/57* (2013.01); *G06F 21/81* (2013.01);
(Continued)

(58) Field of Classification Search
CPC ........ G06F 21/566; G06F 21/51; G06F 21/57; G06F 21/81; G06F 1/08; G06F 1/12; G06F 1/06; G06F 3/1222; G06F 3/1238; G06F 2221/033; G06F 9/4401; H04N 1/0088; H04N 1/00938; H04N 1/00244; H04N 1/0094
See application file for complete search history.

(56) References Cited

U.S. PATENT DOCUMENTS

| | | | |
|---|---|---|---|
| 2006/0069903 A1 | 3/2006 | Fischer et al. | |
| 2007/0266447 A1* | 11/2007 | Hollander ............... | G06F 21/32 726/34 |

(Continued)

FOREIGN PATENT DOCUMENTS

JP 2005-322860 A 11/2005

*Primary Examiner* — Nelson S. Giddins
(74) *Attorney, Agent, or Firm* — Canon U.S.A., Inc. IP Division (57) ABSTRACT

An information processing apparatus includes a verification unit that performs verification of software to be executed by an execution unit, a retaining unit that retains information indicating a voltage supposed to be applied to the execution unit, a power supply unit that applies a predetermined voltage to the execution unit on the basis of the information, and a clock signal output unit that outputs clock signals having frequencies, and the clock signal output unit outputs a clock signal having a first frequency to the verification unit when verification of the software is performed, outputs a clock signal having a second frequency lower than the first frequency to the execution unit before the predetermined voltage is applied to the execution unit, and outputs a clock signal having a third frequency higher than the second frequency to the execution unit after the predetermined voltage is applied to the execution unit.

20 Claims, 9 Drawing Sheets

(51) Int. Cl.
*G06F 1/12* (2006.01)
*G06F 3/12* (2006.01)
*H04N 1/00* (2006.01)

(52) U.S. Cl.
CPC ..... *H04N 1/0088* (2013.01); *G06F 2221/033* (2013.01)

(56) References Cited

U.S. PATENT DOCUMENTS

| | | |
|---|---|---|
| 2010/0175061 A1 | 7/2010 | Maeda et al. |
| 2015/0134999 A1* | 5/2015 | Conrad ................. G06F 1/3296 713/501 |
| 2016/0306635 A1 | 10/2016 | Nakajima |
| 2018/0367315 A1* | 12/2018 | Chen ....................... G06F 21/51 |
| 2019/0097785 A1* | 3/2019 | Elenes .................... H04L 9/002 |
| 2020/0143056 A1* | 5/2020 | Pearson ................ G06F 21/575 |

* cited by examiner

| PROCESS | PROCESS STAGE | STORED INFORMATION (3 bit) | POWER SUPPLY VOLTAGE (V) |
|---|---|---|---|
| SLOW | 0 | 000 | 1.12 |
| ↑ | 1 | 001 | 1.09 |
| ↑ | 2 | 010 | 1.06 |
| ↑ | 3 | 011 | 1.03 |
| TYPICAL | 4 | 100 | 1.00 |
| ↓ | 5 | 101 | 0.97 |
| ↓ | 6 | 110 | 0.94 |
| FAST | 7 | 111 | 0.91 |

FIG. 9

INFORMATION PROCESSING APPARATUS CAPABLE OF DETECTING SOFTWARE TAMPERING AND CONTROL METHOD THEREFOR

BACKGROUND

Field of the Disclosure

The present disclosure relates to an information processing apparatus capable of detecting software tampering and the like.

Description of the Related Art

An information processing apparatus is known that detects software tampering (hereinafter referred to as tampering detection) and prohibits execution of software for which tampering is detected. For example, a sub central processing unit (CPU) performs verification of software to be executed by a main CPU, and the main CPU executes software that has been successfully verified. When the software is not successfully verified, execution of the software is prohibited.

In addition, some information processing apparatuses are equipped with a technology called adaptive supply voltage (ASV) in which a power-supply voltage is changed in accordance with variations from device to device (for example, from CPU to CPU) (Japanese Patent Laid-Open No. 2005-322860). For a fast device (a device capable of operating at a predetermined frequency even with a voltage lower than a predetermined voltage), an operation at the predetermined frequency is realized by applying the voltage lower than the predetermined voltage. As a result, power consumption can be reduced. In addition, for a slow device (a device that operates at a predetermined frequency only with a voltage higher than a predetermined voltage), an operation at the predetermined frequency is realized by applying the voltage higher than the predetermined voltage. Hereinafter setting of a voltage in accordance with variations from device to device will be referred to as ASV processing.

In a case where a device is a slow device, operation of the device may be unstable unless a voltage necessary for the device is input and then a clock signal having a predetermined frequency is input. Thus, until the voltage necessary for the device is input, a clock signal having a frequency lower than the predetermined frequency is input. After the voltage necessary for the device is input, the clock signal having the predetermined frequency is input to the device using, for example, a phase-locked loop circuit (hereinafter referred to as a PLL circuit).

As described above, due to ASV processing, until a voltage necessary for a device is input, a slow clock signal needs to be input in order to operate the device with certainty. Thus, tampering detection processing that is processing executed before the device operates and that is for software to be executed by the device is executed using the slow clock signal. As a result, the tampering detection processing takes a longer time.

SUMMARY

The present disclosure provides an information processing apparatus capable of shortening a time required for tampering detection processing.

According to embodiments of the present disclosure, an information processing apparatus includes an execution unit configured to execute predetermined software, a verification unit configured to perform verification of the predetermined software, a power supply unit configured to output a voltage to the execution unit, a retaining unit configured to retain information corresponding to a voltage that is supposed to be applied to the execution unit, wherein the execution unit sets the voltage to be output by the power supply unit on the basis of the information retained by the retaining unit, and a clock signal output unit configured to output a clock signal having a first frequency to the verification unit at least during verification processing of the predetermined software, the verification processing being performed by the verification unit, and output a clock signal having a second frequency slower than the first frequency to the execution unit at least during setting processing of the voltage to be output by the power supply unit, the setting processing being performed by the execution unit.

Further features of the present disclosure will become apparent from the following description of exemplary embodiments with reference to the attached drawings.

DESCRIPTION OF THE EMBODIMENTS

In the following, embodiments of the present disclosure will be described in detail with reference to the drawings.

In the present embodiment, as an information processing apparatus, an image forming apparatus having a print function and a scan function will be described as an example.

Figure 1:
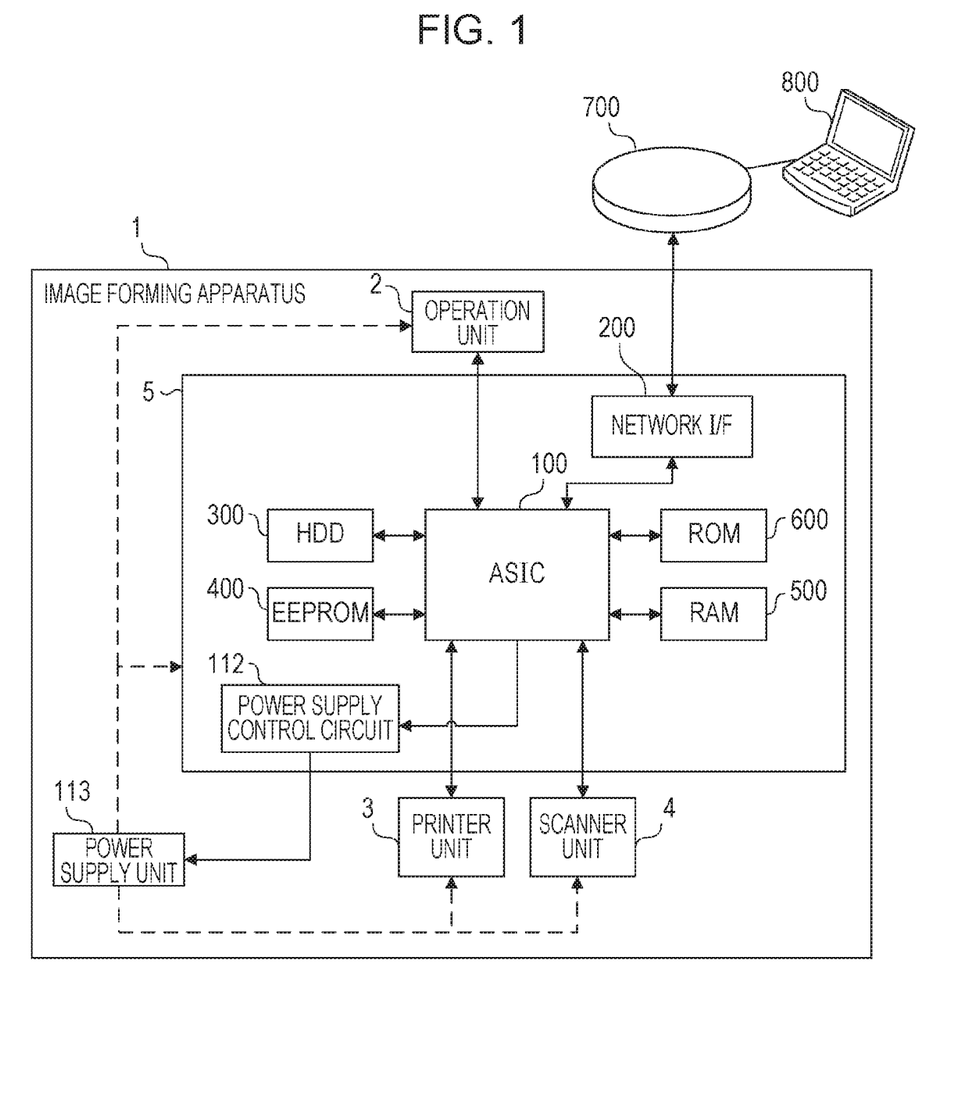
FIG. 1 is a diagram of the overall configuration of an image forming apparatus.

FIG. 1 is a diagram of the overall configuration of an image forming apparatus.

To a network 700, an image forming apparatus 1 and a personal computer (PC) 800 are connected such that communication is possible therebetween. In addition, a Web browser is installed on the PC 800. The Web browser receives, as an input, a uniform resource locater (URL), receives a Web page from a Web server (not illustrated), and can display a Web page on an operation unit (not illustrated) of the PC 800.

The image forming apparatus 1 is equipped with a Web server for causing the user to set various settings of the image forming apparatus 1 through the Web browser of the PC 800. Upon input of an IP address or a host name of the image forming apparatus 1 in an address input field of the Web browser, the Web browser of the PC 800 receives a Web page for setting various settings from the image forming apparatus 1 and displays the Web page on a display unit. The user can set settings for the image forming apparatus 1 through the Web page for setting the various settings.

Next, the configuration of the image forming apparatus 1 will be described. The image forming apparatus 1 has a plurality of function units, a control unit 5, an operation unit 2, the printer unit 3, the scanner unit 4, and a power supply unit 113.

The power supply unit 113 supplies power to the control unit 5, the operation unit 2, the printer unit 3, and the scanner unit 4. The operation unit 2 has a liquid crystal display unit having a touch panel and a keyboard. In addition, the operation unit 2 has a power-saving button for causing the power state of the image forming apparatus 1 to switch to a sleep state. When the power-saving button is pressed in a standby state, the power state of the image forming apparatus 1 is switched to the sleep state, in which less power is consumed than in the standby state. In addition, when the power-saving button is pressed in the sleep state, the power state of the image forming apparatus 1 is switched to the standby state. As long as the sleep state described above is a sleep state in which power to the printer unit 3 or the scanner unit 4 is stopped, the sleep state may be a deep sleep state in which power to the control unit 5 is stopped. In addition, the sleep state may also be a sleep state in which power supply to the control unit 5 is not stopped.

In accordance with a print command received from the user, the printer unit 3 prints an image on a sheet using image data received by the control unit 5. As a printing system for the printer unit 3, an electrophotography system may be employed in which an image is printed by fixing toner on a sheet or an inkjet system may also be employed in which an image is printed by discharging ink onto a sheet. In accordance with a scan command received from the user, the scanner unit 4 scans a document image and transmits image data of the scan image to the control unit 5.

The control unit 5 has an application specific integrated circuit (ASIC) 100. In addition, the control unit 5 has a read-only memory (ROM) 600 and a random access memory (RAM) 500. The control unit 5 has a hard disk drive (HDD) 300, an electrically erasable programmable read-only memory (EEPROM) 400, and a network interface (I/F) 200. In addition, the control unit 5 has a power supply control circuit 112.

The control unit 5 executes various functions of the image forming apparatus 1. The ASIC 100 reads out a control program stored in the ROM 600 or the HDD 300 and performs various types of control such as print control and scan control. The RAM 500 is a volatile memory and is a working memory used when the control program is executed. The HDD 300 is a storage medium such as a magnetic disk and stores, for example, the control program and image data. The EEPROM 400 is a nonvolatile memory and stores, for example, setting values to which reference is made when the control program is executed.

The network I/F 200 receives print data and various data from the PC 800 via the network 700.

When receiving a switching request to the sleep state from, for example, the power-saving button, the power supply control circuit 112 stops power supply from the power supply unit (the power supply unit) 113 to the printer unit 3 and the scanner unit 4. As a result, the image forming apparatus 1 switches to the sleep state. In addition, when receiving a request to return from the sleep state from, for example, the power-saving button, the power supply control circuit 112 performs control such that power is supplied from the power supply unit 113 to the printer unit 3 and the scanner unit 4.

Configuration of ASIC 100

Figure 2:
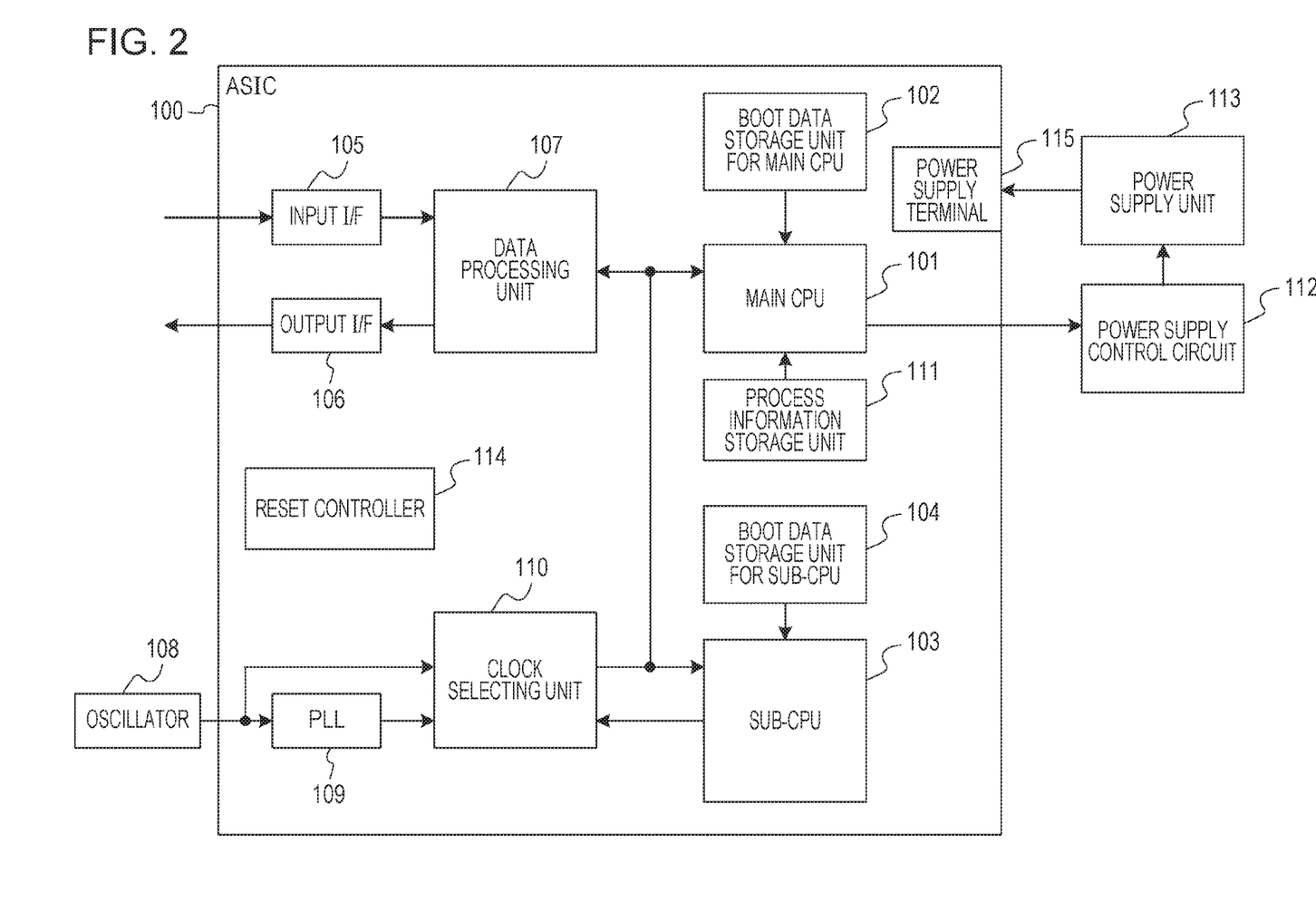
FIG. 2 is a block diagram of an application specific integrated circuit (ASIC).

FIG. 2 is a block diagram of the ASIC 100.

The ASIC 100 has a main CPU (an execution unit) 101, a storage unit 102 for storing boot data for the main CPU 101, a sub-CPU (a verification unit) 103, and a storage unit 104 for storing boot data for the sub-CPU 103. In addition, the ASIC 100 has an input interface 105, an output interface 106, a data processing unit 107, a phase locked loop (PLL) 109, and a clock selecting unit (a signal selecting unit) 110. In addition, the ASIC 100 has a process information storage unit (a retaining unit) 111, a reset controller 114, and a power supply terminal 115. A clock signal Output unit according to the present disclosure includes an oscillator 108, the PLL 109, and the clock selecting unit 110.

The main CPU 101 controls devices inside the ASIC 100. Basically, the main CPU 101 can operate using a clock signal having a frequency of 1200 MHz in a case where a power-supply voltage of 1.0 V is applied thereto. However, depending on device variations, there may be a case where the main CPU 101 is operable at 1200 MHz even when the power-supply voltage is less than 1.0 V, and there may also be a case where the main CPU 101 does not operate at 1200 MHz unless a power-supply voltage higher than 1.0 V is applied thereto.

The storage unit 102 stores a program executed when the main CPU 101 boots up and various types of data used when the main CPU 101 boots up (hereinafter the program and various types of data are collectively referred to as boot data). The storage unit 102 is a read-only memory (ROM).

The sub-CPU 103 performs auxiliary control for the main CPU 101.

The storage unit 104 stores a program executed when the sub-CPU 103 boots up and various types of data used when the sub-CPU 103 boots up. The storage unit 104 is a ROM.

In the present embodiment, when the image forming apparatus 1 is switched on (when the ASIC 100 is reset), the sub-CPU 103 boots up earlier than the main CPU 101. That is, when the image forming apparatus 1 is switched on (when the ASIC 100 is reset), the sub-CPU 103 hoots up using the boot data stored in the storage unit 104, and performs verification of the boot data stored in the storage unit 102. As a result of the verification of the boot data by the sub-CPU 103, in a case where it is determined that the boot data to be executed by the main CPU 101 has not been tampered with, the main CPU 101 executes the boot program stored in the storage unit 102.

The input interface (hereinafter referred to as I/F) 105 is an interface through which data is input from outside the ASIC 100. The output interface 106 is an interface through which data is output to the outside.

The data processing unit 107 is a module that performs predetermined processing on data input from the input I/F 105. For example, the data processing unit 107 receives image data and performs image processing (enlargement, reduction, correction, and the like) on the received image data.

The oscillator 108 supplies a clock signal to the ASIC 100. The oscillator 108 supplies, for example, a clock signal having 10 MHz. The PLL 109 is a circuit that converts the frequency of the clock signal supplied from the oscillator 108 into a desired frequency and outputs the resulting clock signal. The PLL 109 converts the frequency (10 MHz) of an input clock signal into, for example, a 1200 MHz clock signal, which has a 120 times higher frequency, and outputs the 1200 MHz clock signal.

The clock selecting unit (multiplexer (MUX)) 110 receives the clock signal supplied by the oscillator 108 and the clock signal supplied by the PLL 109. The clock selecting unit 110 outputs either of the clock signal supplied by the oscillator 108 and the clock signal supplied by the PLL 109. In the present embodiment, the clock selecting unit 110 outputs, in accordance with a command from the sub-CPU 103, either of the clock signal supplied by the oscillator 108 and the clock signal supplied by the PLL 109, The modules inside the ASIC 100 (the main CPU 101, the sub-CPU 103, the data processing unit 107, and other circuits) perform data reception and transmission therebetween in relation to synchronization, and thus the clock signals input to the modules need to be synchronized to each other. In the present embodiment, the clock signals to be supplied to the modules branch from the clock signal output from the clock selecting unit 110. As long as the phases of the clock signals input to the modules are synchronized with each other, the clock signals may have different frequencies.

The process information storage unit 111 stores process information (3-bit information) regarding the main CPU 101. The process information storage unit 111 is a ROM.

The power supply control circuit 112 changes the voltage to be output by the power supply unit 113. The power supply control circuit 112 changes the voltage to be output from the power supply unit 113, on the basis of the process information stored in the process information storage unit 111. The power supply unit 113 applies a voltage to the ASIC 100 via the power supply terminal 115. The power supply unit 113 applies a predetermined voltage to the ASIC 100 on the basis of a voltage control signal output from the power supply control circuit 112.

The reset controller 114 outputs a reset signal to the modules inside the ASIC 100. When the image forming apparatus 1 is switched on (when the ASIC 100 is reset), the reset controller 114 cancels reset of the sub-CPU 103 and the storage unit 104. Next, in accordance with a command from the sub-CPU 103, the reset controller 114 cancels reset of the main CPU 101.

The ASIC 100 is operable in two operation modes, which are a slow-speed operation mode and a high-speed operation mode. In the slow-speed operation mode, the clock selecting unit 110 selects and outputs, in accordance with a command from the sub-CPU 103, the clock signal input from the oscillator 108. As illustrated in FIG. 2, the output clock signal is used as a clock signal for operating the main CPU 101, the sub-CPU 103, and the data processing unit 107. In addition, although not illustrated in FIG. 2, the clock signal is input to circuits other than those described above.

In FIG. 2, the clock signal output from the clock selecting unit 110 is directly supplied to the modules; however, a clock signal whose frequency has been reduced by using, for example, a frequency divider circuit may also be supplied to the modules.

In the high-speed operation mode, the clock selecting unit 110 selects and outputs, in accordance with a command from the sub-CPU 103, the clock signal input from the PLL 109. As illustrated in FIG. 2, the output clock signal is used as a clock signal for operating the main CPU 101, the sub-CPU 103, and the data processing unit 107, in addition, although not illustrated in FIG. 2, the clock signal is input to circuits other than those described above.

Sub-CPU Operation Flowchart

Figure 3:
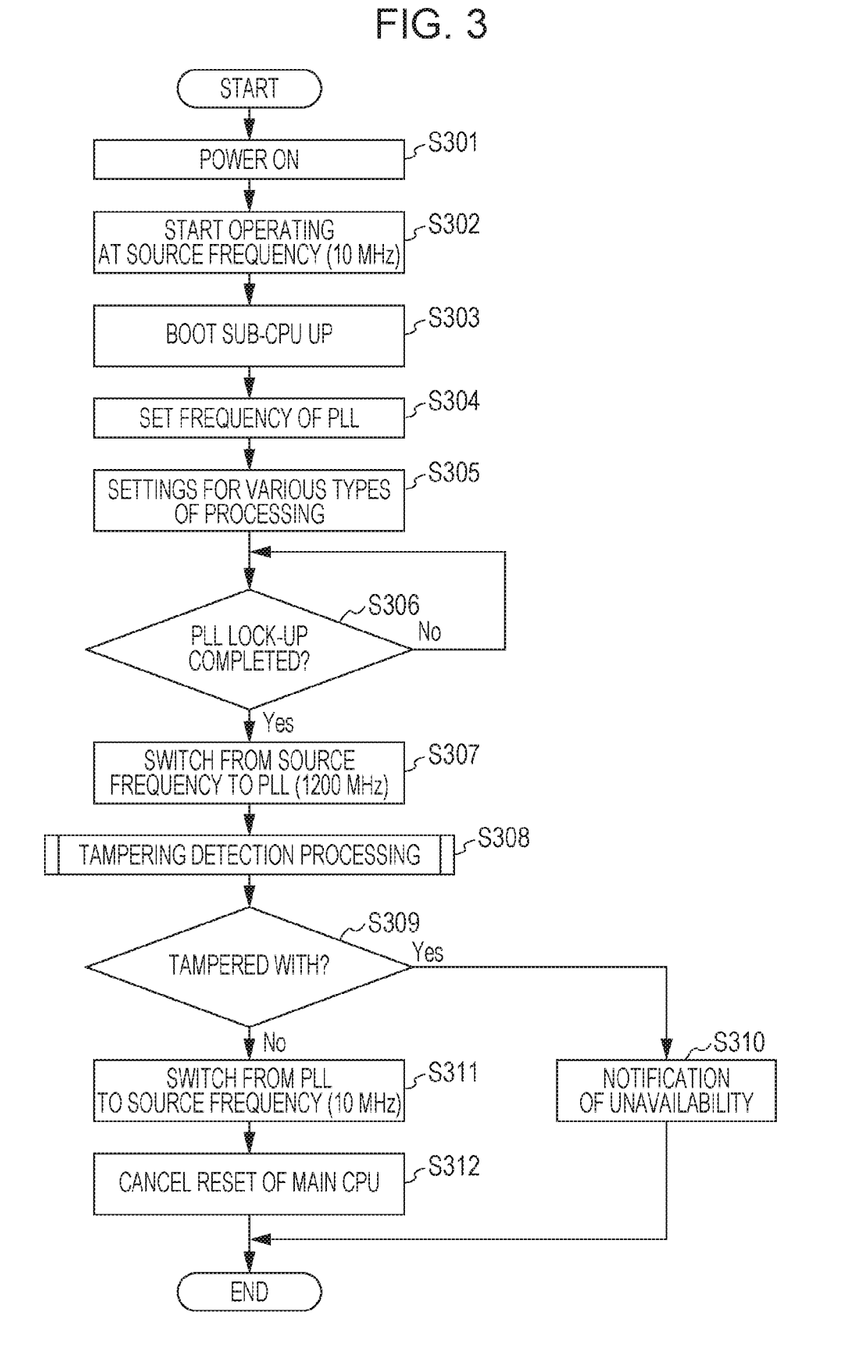
FIG. 3 is a flowchart illustrating processing executed by a sub central processing unit (CPU).

FIG. 3 is a flowchart illustrating processing executed by the sub-CPU 103.

When the image forming apparatus is switched on by the user (S301), a reset signal is input to the ASIC 100. When the ASIC 100 is reset, the ASIC 100 enters the slow-speed operation mode on the basis of initial settings. The clock signal (10 MHz) output from the oscillator 108 is input to the sub-CPU 103 (S302). The reset controller 114 cancels reset of the sub-CPU 103 and the storage unit 104 using a hardware sequence. As a result, the sub-CPU 103 executes the boot data stored in the storage unit 104 (S303).

The booted sub-CPU 103 sets settings such that the PLL 109 outputs a 1200 MHz clock signal. As a result, the PLL 109 causes a 1200 MHz clock signal to oscillate (S304).

Thereafter, the sub-CPU 103 sets various parameters such that the data processing unit 107 executes predetermined processing (S305). The sub-CPU 103 then determines whether a lock-up time for the PLL 109 has elapsed (S306). A lock-up time is a time required for the PLL 109 to cause a signal having a predetermined frequency (in this case, 1200 MHz) to stably oscillate.

In a case where it is determined that the lock-up time has elapsed (Yes in S306), the sub-CPU 103 switches the output of the clock selecting unit 110 from the clock signal output from the oscillator 108 to the clock signal output from the PLL 109 (S307), As a result, the ASIC 100 enters the high-speed operation mode.

In the present embodiment, the sub-CPU 103 then performs verification of the boot data for the main CPU 101 (S308), For example, the sub-CPU 103 compares a correct value prestored in the storage unit 104 with a hash value of the boot data stored in the storage unit 102. In a case where the correct value matches the hash value of the hoot data, the sub-CPU 103 determines that the boot data has not been tampered with, and in a case where the correct value does not match the hash value of the boot data, the sub-CPU 103 determines that the boot data has been tampered with, Note that the boot-data tampering detection method will be described in detail with reference to FIGS. 4 and 5.

In a case where it is determined that the boot data has been tampered with (Yes in S309), the main CPU 101 does not execute the boot data, and the sub-CPU 103 notifies the user and the administrator that tampering has occurred (S310), As the notification method, for example, an unillustrated light-emitting diode (LED) (a light output unit) may be lit up or a sound notification may be used.

In a case where it is determined that the boot data has not been tampered with (No in S309), the sub-CPU 103 switches the output of the clock selecting unit 110 from the clock signal output from the PLL 109 to the clock signal output from the oscillator 108 (S311). As a result, the ASIC 100 enters the slow-speed operation mode.

The sub-CPU 103 then cancels reset of the main CPU 101 and other circuits (S312). As a result, the main CPU 101 starts to boot up.

Main CPU Operation Flowchart

Figure 4:
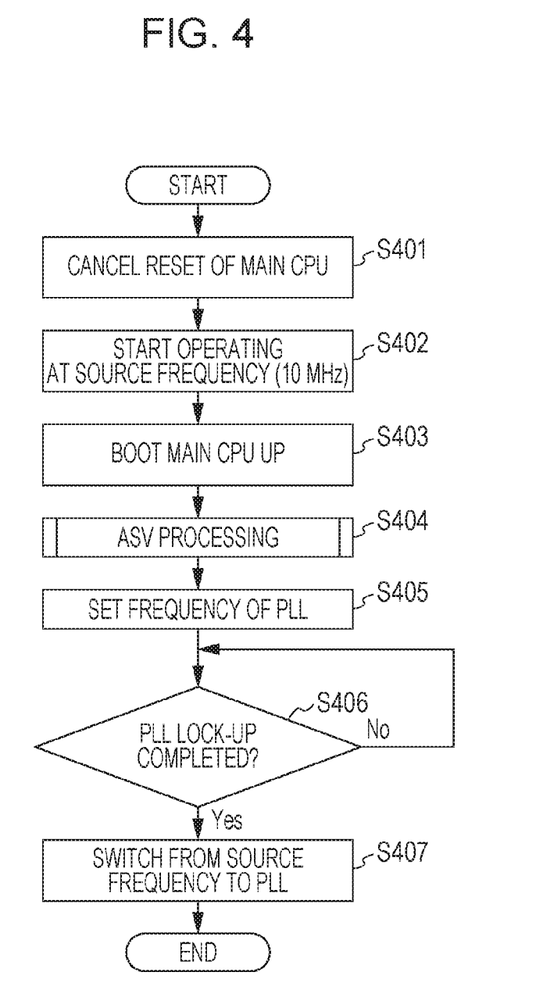
FIG. 4 is a flowchart illustrating processing executed by a main CPU.

FIG. 4 is a flowchart illustrating processing executed by the main CPU 101.

When reset of the main CPU 101 is canceled (S401), the main CPU 101 starts operating using the clock signal output from the oscillator 108 (S402). The main CPU 101 executes the boot data stored in the storage unit 102 (S403). The boot data has been verified and it is determined that the boot data has not been tampered with. In the present embodiment, the main CPU 101 executes ASV processing (S404). Details of the ASV processing will be described with reference to FIGS. 6, 7, and 8.

When the ASV processing ends, the main CPU 101 sets settings such that the PLL 109 outputs a 1200 MHz clock signal (S105), Thereafter, the main CPU 101 determines whether the lock-up time for the PLL 109 has elapsed (S406). In a case where it is determined that the lock-up time for the PLL 109 has elapsed (Yes in S406), the main CPU 101 switches the output of the clock selecting unit 110 from the clock signal output from the oscillator 108 to the clock signal output from the PLL 109 (S407). As a result, the ASIC 100 enters the high-speed operation mode. Thereafter, the main CPU 101 controls data processing performed at the data processing unit 107.

At the time when the ASIC 100 enters the high-speed operation mode, the settings for various types of data processing to be executed at the data processing unit 107 are set as various settings for the ASIC 100. In addition, the power-supply voltage to the main CPU 101 is changed to a voltage suitable for processing to be performed by the main CPU 101, and thus the main CPU 101 can execute various types of data processing.

In accordance with the flowchart above, before the main CPU 101 performs the ASV processing, the sub-CPU 103 can perform the tampering detection processing using the high frequency clock signal output from the PLL 109, and thus tampering detection processing can be completed in a short time. In addition, after the sub-CPU 103 ends the tampering detection processing, the clock signal supplied to the main CPU 101 is switched to the low frequency clock signal from the oscillator 108, and thus the main CPU 101 can perform the ASV processing.

Tampering Detection Processing

Figure 5:
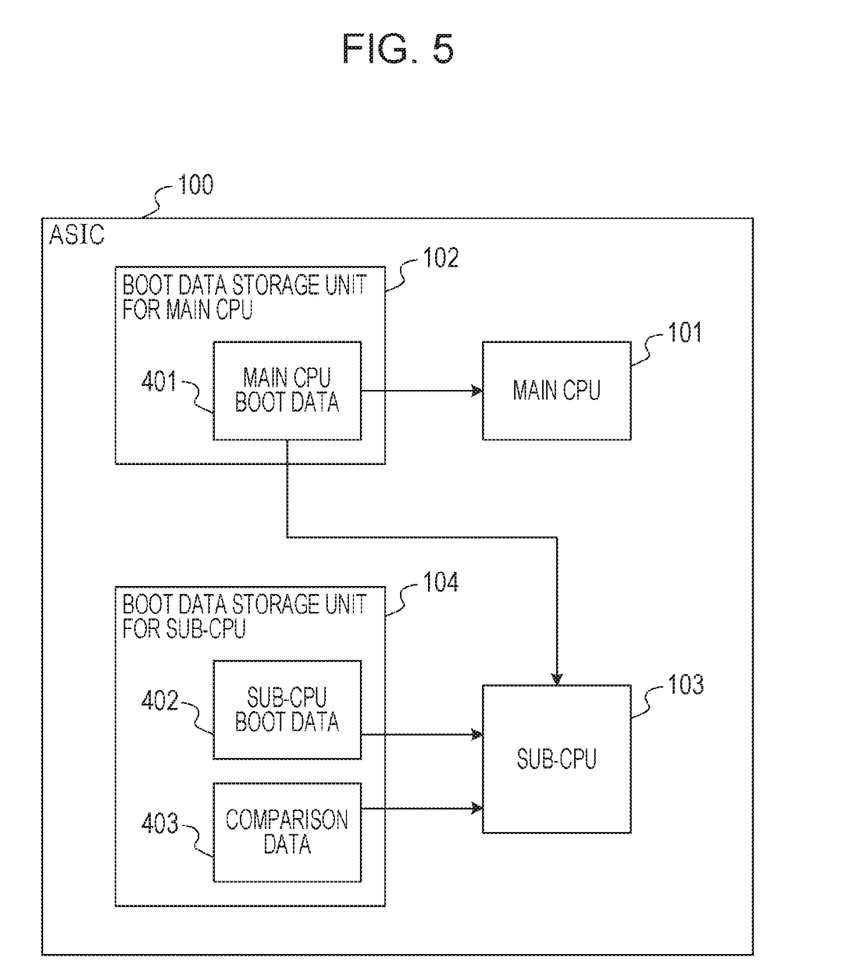
FIG. 5 is a diagram illustrating details of blocks related to verification of a boot program.

Next, the details of the tampering detection processing for a boot program in S308 of FIG. 3 will be described. FIG. 5 is a diagram illustrating details of blocks related to the verification of the boot program.

The storage unit 102 stores boot data 401 for the main CPU 101. When reset of the main CPU 101 is canceled, the main CPU 101 reads and executes the boot data 401 for the main CPU 101 stored in the storage unit 102, As a result, the main CPU 101 starts to boot up. The storage unit 104 stores boot data 402 for the sub-CPU 103, When reset of the sub-CPU 103 is canceled, the sub-CPU 103 reads and executes the boot data 402 for the sub-CPU 103 stored in the storage unit 104. As a result, the sub-CPU 103 starts to boot up.

In addition, the storage unit 104 stores comparison data (a correct value) that is to be compared with the boot data 401 to be executed by the main CPU 101.

Figure 6:
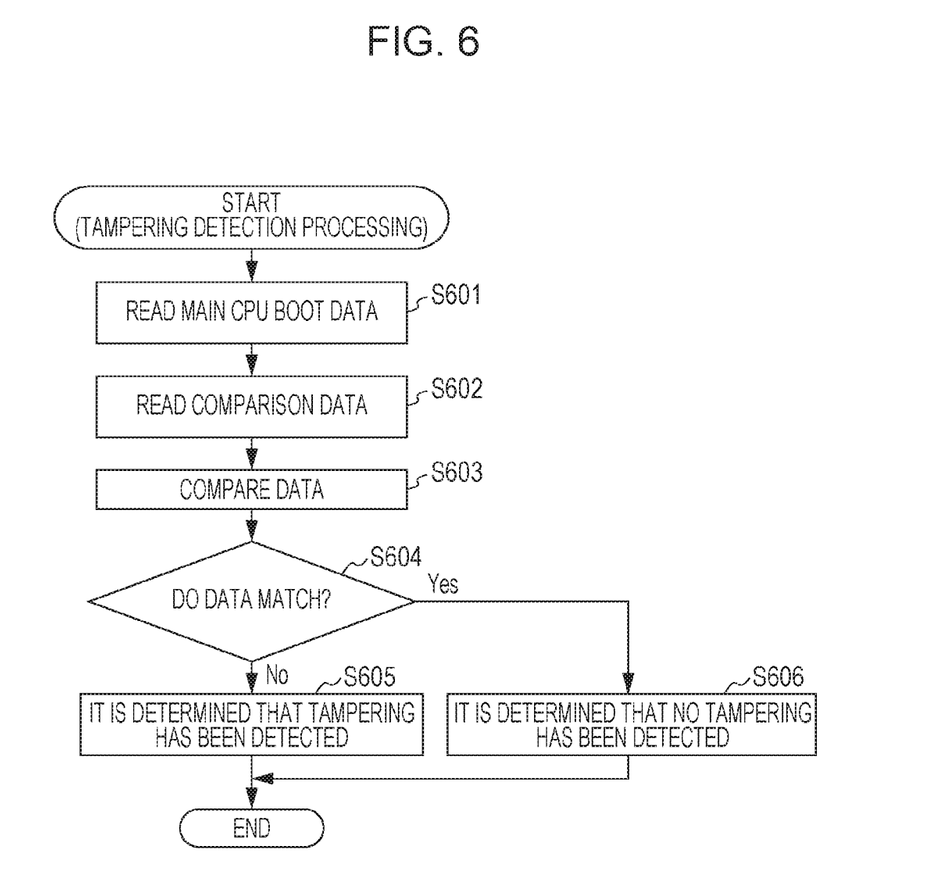
FIG. 6 is a diagram illustrating a flowchart for a boot program verification method.

FIG. 6 is a diagram illustrating a flowchart for a boot program verification method.

The sub-CPU 103 reads a predetermined amount of data (for example, 100 kB) from the first data of the boot data 401 for the main CPU 101 stored in the storage unit 102 (S601). The read data is stored in a buffer memory of the sub-CPU 103. The sub-CPU 103 reads comparison data 403 as much as the data read from the storage unit 102 (S602). The sub-CPU 103 then compares the boot data 401 for the main CPU 101 stored in the buffer memory with the comparison data 403 (S603), As a result of the comparison, in a case where the boot data 401 differs from the comparison data 403 (No in S604), the sub-CPU 103 determines that the boot data 401 has been tampered with (S605).

In contrast, as a result of the comparison, in a case where the hoot data 401 matches the comparison data 403 (Yes in S604), the sub-CPU 103 determines that the boot data 401 has not been tampered with (S606).

In the present embodiment, the boot data 401 for the main CPU 101 itself is compared with the comparison data 403, However, a hash value of the boot data 401 for the main CPU 101 is calculated, and the verification of the boot data 401 may also be performed by comparing the hash value with the prestored correct value.

In addition, in the present embodiment, the verification of part of the boot data 401 (100 kB) is performed; however, the verification of all the boot data 401 may also be performed.

ASV Processing

Figure 7:
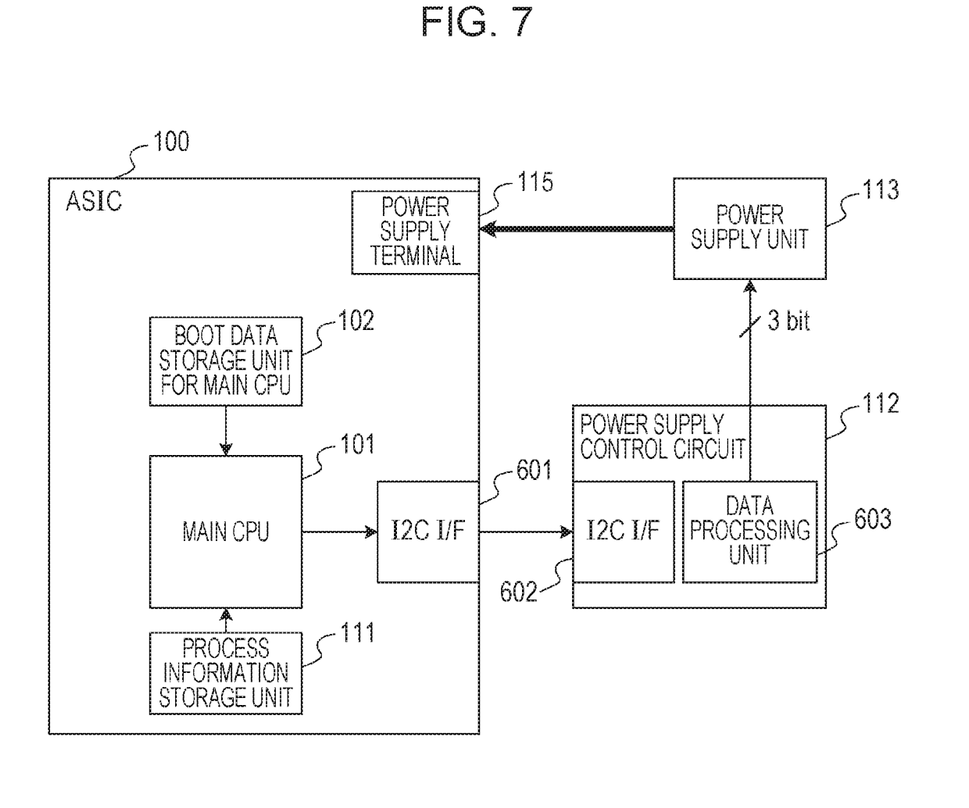
FIG. 7 is a diagram illustrating details of blocks related to ASV processing.

Next, details of the ASV processing in S404 of FIG. 4 will be described, FIG. 7 is a diagram illustrating details of blocks related to the ASV processing.

The process information storage unit 111 stores process information regarding the main CPU 101, The process information storage unit 111 is a ROM, In the present embodiment, the process for the main CPU 101 is classified into eight stages from slow to fast, 3-bit data is stored as information regarding the process in the process information storage unit 111.

Figure 8:
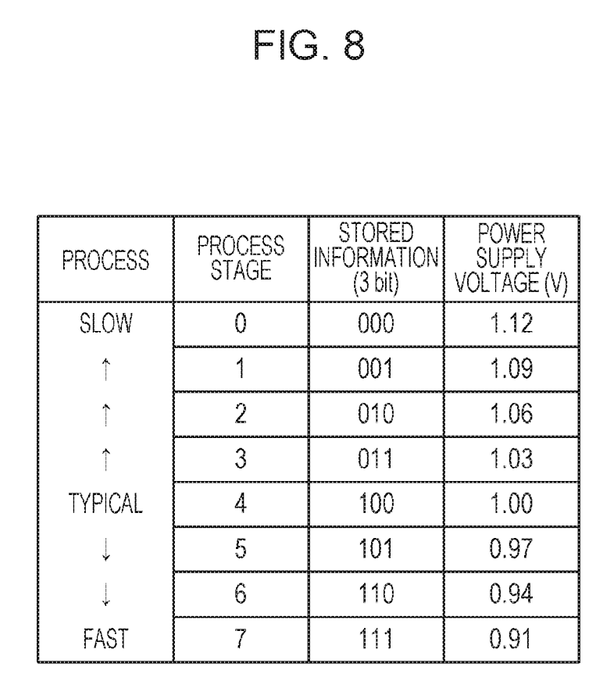
FIG. 8 is a diagram illustrating details of information stored in a process information storage unit.

FIG. 8 is a diagram illustrating details of the information stored in the process information storage unit 111. As illustrated in FIG. 8, a typical process is set to "4", and is represented as 3-bit data "100". The slowest process is set to "0", and is represented as 3-bit data "000", Moreover, the fastest process is set to "7", and is represented as 3-hit data "111".

Returning to FIG. 7, the power supply control circuit 112 receives, from the main CPU 101, the process information stored in the process information storage unit 111. On the basis of the received process information, the power supply control circuit 112 outputs a control signal for changing the voltage to be output from the power supply unit 113. The main CPU 101 outputs the 3-bit data to the power supply control circuit 112. The ASIC 100 and the power supply control circuit 112 are connected by a serial bus. An I2C (I-squared-C) I/F unit 601 of the ASIC 100 and an I2C I/F unit 602 of the power supply control circuit 112 perform communication using the I2C protocol.

A data processing unit 603 of the power supply control circuit 112 outputs, as a 3-bit control signal, 3-bit process information input via the I2C OF unit 602 to the power supply unit 113. When the image forming apparatus 1 is switched on, the power supply unit 113 outputs a typical voltage, that is, a voltage of 1.0 V in the present embodiment. Thereafter, the power supply unit 113 applies a predetermined voltage to the power supply terminal 115 on the basis of the control signal input from the power supply control circuit 112. For example, as illustrated in FIG. 8, in a case where the main CPU 101 is a typical chip, the 3-bit data output from the process information storage unit 111 is "100". The power-supply voltage applied to the main CPU 101 is 1.0 V. In addition, in a case where the main CPU 101 performs the slowest process, the 3-bit data output from the process information storage unit 111 is "000". The power-supply voltage applied to the main CPU 101 is 1.12 V (see FIG. 8). In addition, in a case where the main CPU 101 performs the fastest process, the 3-bit data output from the process information storage unit 111 is "111". The power-supply voltage applied to the main CPU 101 is 0.91 V (see FIG. 8).

Figure 9:
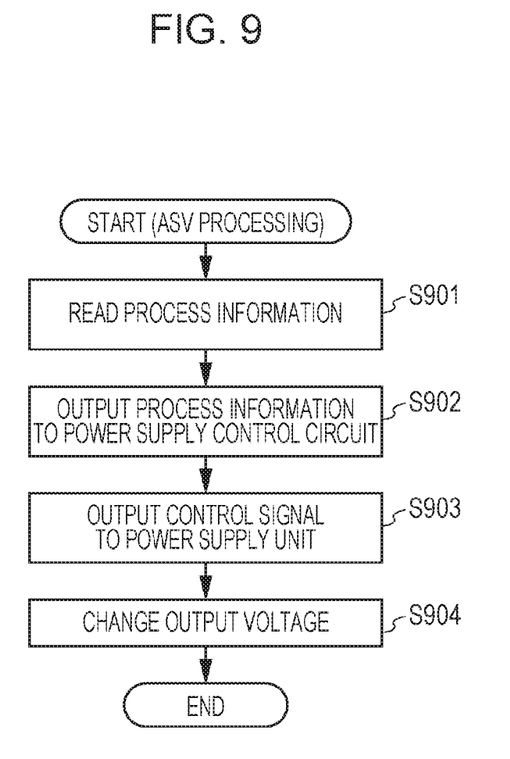
FIG. 9 is a flowchart illustrating details of the ASV processing.

FIG. 9 is a flowchart illustrating details of the ASV processing.

The main CPU 101 reads process information recorded in three bits from the process information storage unit 111 (S901). In the present embodiment, the process information regarding the main CPU 101 and recorded in three bits is read by reading out data at a specific address of the process information storage unit 111. The main CPU 101 outputs the 3-bit process information to the power supply control circuit 112 (S902). In the present embodiment, the main CPU 101 transmits the process information in accordance with the I2C protocol.

The power supply control circuit 112 receives the 3-bit process information input from the ASIC 100. The data processing unit 603 outputs a control signal for changing the output voltage of the power supply unit 113 to the power supply unit 113 (S903). The power supply unit 113 is provided with a 3-bit input terminal for controlling the output voltage. The power supply unit 113 adjusts, on the basis of the control signal input to the input terminal, the power-supply voltage to be applied to the main CPU 101 (S904).

The relationship between the 3-bit control signal and the power-supply voltage output from the power supply unit 113 is illustrated in FIG. 8. In a case where the 3-bit data is "100", the power supply unit 113 outputs 1.0 V to the main CPU 101. In addition, in a case where the 3-bit data is "110", the power supply unit 113 outputs 0.94 V to the main CPU 101.

OTHER EMBODIMENTS

In the embodiment described above, the clock selecting unit 110 outputs either the clock signal supplied from the oscillator 108 or the clock signal supplied from the PLL 109. The clock selecting unit 110 may receive three or more clock signals having different frequencies and may output any one of the clock signals.

For example, the clock selecting unit 110 outputs a 1200 MHz clock signal to the sub-CPU 103 when the sub-CPU 103 performs verification of the boot data, and outputs a 10 MHz clock signal to the main CPU 101 when the main CPU 101 performs the ASV processing. The clock selecting unit 110 then outputs a 1200 MHz clock signal to the main CPU 101 when the ASV processing is completed. As long as the frequency of the clock signal output from the clock selecting unit 110 is high, then low, and then high, the frequencies are not limited to 10 MHz and 1200 MHz. The frequency of the clock signal at the time when the verification of the boot data is performed does not have to be the same as the frequency of the clock signal after the ASV processing is completed.

The present disclosure provides an information processing apparatus capable of shortening a time required for tampering detection processing.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by; for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-21373, filed Nov. 14, 2018, which is hereby incorporated by reference herein in its entirety.

What is claimed is:

1. An information processing apparatus comprising:
a first controller configured to execute predetermined software;
a second controller configured to perform verification whether the predetermined software is tampered, wherein the second controller is caused to operate by receiving a clock signal;
a power source voltage circuit configured to supply a voltage to the first controller; and
a power source controller configured to change the voltage to be supplied by the power source voltage circuit to the first controller, after the verification is performed and a result of the verification is that the predetermined software is not tampered,
wherein the second controller performs the verification whether the predetermined software is tampered or not, after the received clock signal is switched from a clock signal having a first frequency to a clock signal having a second frequency higher than the first frequency.

2. The information processing apparatus according to claim 1, further comprising: a signal generation circuit configured to supply at least the clock signal having the first frequency to the first controller and the second controller, wherein the first controller is caused to operate by receiving a clock signal.

3. The information processing apparatus according to claim 2, further comprising: a frequency change circuit configured to receive the clock signal having the first frequency and output the clock signal having the second frequency.

4. The information processing apparatus according to claim 2, wherein the signal generation circuit outputs a clock signal having a third frequency higher than the first frequency after the voltage to be supplied by the power source voltage circuit is changed by the first controller.

5. The information processing apparatus according to claim 4, wherein the second frequency is the same as the third frequency.

6. The information processing apparatus according to claim 1, further comprising: an output switch circuit configured to receive the clock signal having the first frequency and the clock signal having the second frequency, and output either of the clock signal having the first frequency and the clock signal having the second frequency.

7. The information processing apparatus according to claim 6, wherein the second controller sets a frequency to be output by the output switch circuit.

8. The information processing apparatus according to claim 6, wherein the output switch circuit outputs the clock signal having the first frequency in a case where the predetermined software is not tampered.

9. The information processing apparatus according to claim 8, wherein the power source controller changes the voltage to be supplied to the first controller after the verification is performed, wherein the result of the verification is that the predetermined software is not tampered, and the clock signal to be supplied by the signal generation circuit is switched from the clock signal having the second frequency to the clock signal having the first frequency.

10. The information processing apparatus according to claim 1, further comprising: a notification circuit configured to send information indicating the result of the verification performed by the second controller is that the predetermined software is tampered.

11. The information processing apparatus according to claim 10, wherein the notification circuit is a light-emitting diode (LED) configured to output light.

12. The information processing apparatus according to claim 1, wherein the second controller verifies whether the predetermined software is tampered by comparing a portion of the predetermined software to be executed by the first controller with a prestored correction value.

13. The information processing apparatus according to claim 1, wherein the output switch circuit outputs the clock signal having the first frequency and the clock signal having the second frequency to the first controller and the second controller.

14. The information processing apparatus according to claim 1, wherein verification processing of the verification whether the predetermined software is tampered or not is at least one of processing for reading the predetermined software, processing for reading comparison data to be compared with a value corresponding to the predetermined software, processing for comparing the value corresponding to the predetermined software with the comparison data, and processing for determining whether the value corresponding to the predetermined software matches the comparison data, the verification processing being performed by the second controller.

15. The information processing apparatus according to claim 1, wherein setting processing of the voltage to be output by the power source voltage circuit is performed by the first controller, and the setting processing is at least one of processing for reading information corresponding to the voltage from the power source controller and processing for outputting to the power source voltage circuit the information read from the power source controller, the setting processing being performed by the first controller.

16. The information processing apparatus according to claim 1, wherein the first controller and the second controller have a synchronization relationship.

17. The information processing apparatus according to claim 1, wherein the predetermined software is boot data for the first controller.

18. The information processing apparatus according to claim 1, further comprising: a printer configured to print an image on a sheet.

19. The information processing apparatus according to claim 1, further comprising: a scanner configured to scan an image of a document.

20. A control method for an information processing apparatus, comprising:

supplying a voltage to a first controller;

performing, by a second controller, verification whether predetermined software to be executed by the first controller is tampered, wherein the second controller is caused to operate by receiving a clock signal; and changing the voltage to be supplied to the first controller, after the verification is performed and a result of the verification is that the predetermined software is not tampered, wherein the second controller performs the verification whether the predetermined software is tampered or not, after the received clock signal is switched from a clock signal having a first frequency to a clock signal having a second frequency higher than the first frequency.

* * * * *